Oct. 2, 1945.  W. H. HUNTER  2,386,116
FRICTIONAL MECHANISM
Filed Dec. 11, 1943   2 Sheets-Sheet 1

Inventor
Willson H. Hunter
By Willis F. Avery
Atty.

Oct. 2, 1945. W. H. HUNTER 2,386,116
FRICTIONAL MECHANISM
Filed Dec. 11, 1943 2 Sheets-Sheet 2

Inventor
Willson H. Hunter
By Willis F. Avery
Atty.

Patented Oct. 2, 1945

2,386,116

UNITED STATES PATENT OFFICE 2,386,116

FRICTIONAL MECHANISM

Willson H. Hunter, Lakewood, Ohio, assignor to The B. F. Goodrich Company, New York, N. Y., a corporation of New York Application December 11, 1943, Serial No. 513,822

18 Claims. (Cl. 188—152)

This invention relates to frictional mechanisms for rotatable bodies such as brakes for wheels of aircraft or other vehicles although features of the invention are useful in other mechanisms such as clutches operated by fluid pressure.

The principal objects of the invention are to provide dependable operation, to provide for facility of maintenance, and to provide for longevity of the mechanism.

Further objects of the invention are to provide for concealing and protecting the retractor springs and associated parts and to provide for convenient replacement of retractor springs and other brake elements.

These and further objects will become apparent from the following description and accompanying drawings in which Figure 1 is a side elevation of a frictional mechanism suitable for a brake, partly broken away and partly in section, constructed in accordance with and embodying the invention.

Figure 1:
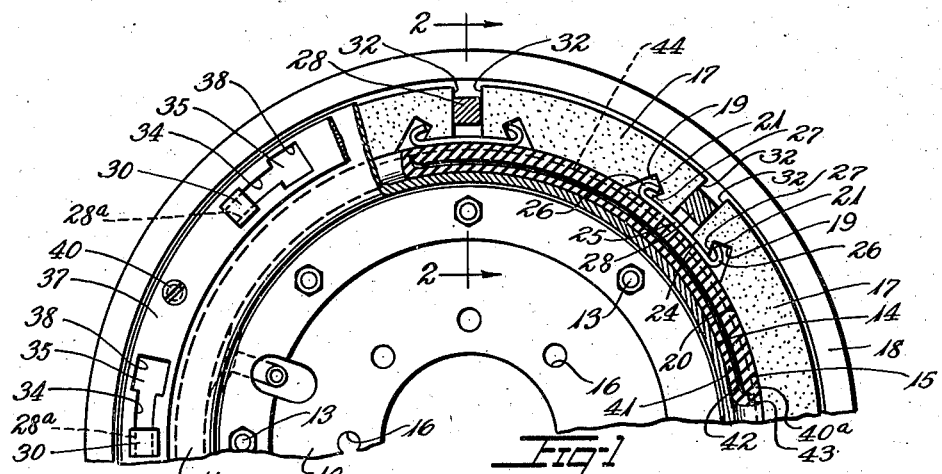
Figure 2:
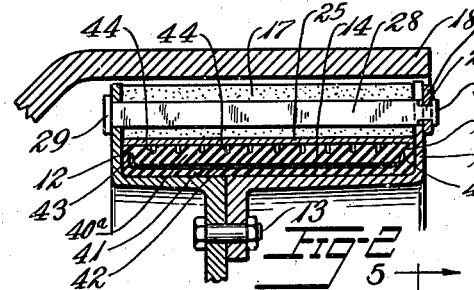
Fig. 2 is a cross-section thereof taken along the line 2—2 of Fig. 1.

Referring to the embodiment of the invention shown in Figs. 1 and 2, a torque frame 10 is provided with removable and fixed radial flanges 11 and 12, respectively, fastened together by bolts 13 to provide a circumferential outwardly facing channel 14 for confining an annular expander tube 15. The frame 10 may be secured through holes 16 to an associated mounting flange of a shaft (not shown). A series of friction blocks 17 is mounted over the annular expander tube 15 within the channel 14 so that these blocks can move radially into frictional engagement with a rotatable friction member or brake drum 18 when fluid pressure is applied to the expander tube 15. For retaining the friction blocks against the expander tube, the friction blocks 17 have axially disposed slots 19 formed in their inner surfaces 20 near the circumferential ends of the blocks under-cut from the inner peripheral surface of the block toward the end of the block at an angle oblique to a radius of the structure and terminating at 21 short of such end of the block.

That portion of the inner peripheral surface 20 of the friction blocks that lies between the slots 19 and the end of friction block 17 is relieved so that a recess 24 connecting with the slot 19 is formed in each end of each block to accommodate the thickness of a C-shaped clip retractor spring 25 preferably extending the width of the channel 14 and having its radial margins 26 inwardly bent to engage the slots 19 and preferably rounded to be received in the undercut slots 19 of adjacent friction blocks 17 while permitting some relative movement of the blocks. The arrangement is such that, as the friction blocks 17 move radially outward under the fluid pressure of the expander tube 15, the rounded margins 26 of the springs 25 exert counter-pressure on the walls 27 of the undercut slots tending to force the blocks together and to contract the series of blocks to a lesser circumference. When radial pressure is released from the blocks, the counter-pressure exerted on the walls 27 of the undercut slots 19 in the adjacent block ends returns the blocks to their original position in the channel 14 of the torque frame 10 by drawing the blocks toward one another, thus reducing their circumference.

The springs 25 may be substantially equal in width to the blocks 17 and completely cover the space between the expander tube and the gap between adjacent blocks thereby protecting the tube from pinching and from heat radiating from the brake drum.

The end faces 32, 32 of each pair of adjacent blocks are adapted to bear on a thrust pin 28, which may be of square cross section, to limit undesirable circumferential displacement of the blocks 17 as the blocks 17 are moved in radial compression against a friction drum 18. Such pins 28 may be arranged between each successive pair of friction blocks, thereby dividing the torsional load. The pins are arranged to engage flanges 11 and 12 and are secured in a removable manner for facility of assembly and repair. For this purpose, the head 29 of the thrust pin 28, which passes through the flange 12, seats against the torque flange 12 and if desired the pin 28 may be tack welded to the torque flange 12 at the head 29. The other end 30 of the thrust pin 26 extends outward through the flange 11 and preferably has a reduced neck 28a which fits into the narrow part 34 of a button hole slot 35 of a locking ring 37 seated on the outer face of flange 11. The outmost end 30 of the thrust pins 26 is no larger than the body of the pin 26 so that it may be inserted through the space between the friction blocks 17 during assembly and through the hole 38 of the locking ring 37. The ring 37 may then be shifted to move the narrow neck 34 of the button hole slot 35 about the reduced portion 28a of the pin 26 and locked against further rotation by a locking screw 40 engaging the flange 11 so that the ring 37 cannot change position and free the thrust pins 26.

With the thrust pins 26 locked on the torque frame 10, the friction blocks 17 may be moved radially between the pins 26 into radial compression against the drum 18 by the pressure exerted by the expander tube 15 to retard or stop the rotatable drum 18 while the circumferential thrust on the blocks is transferred to the flanges 11, 12 by the pins 26. When the pressure is released from the friction blocks 17, the retractor springs 25, which exert pressure on the walls 27 of the undercut slots 19, can urge the blocks closer together and move these blocks radially inward and away from the frictional drum 18.

In assembling the structure, with the flange 11 removed, the expander tube 15 may be laid in the channel 14 and the friction blocks and springs 25 assembled thereabout. The pins 26 are passed between the blocks and inserted in the flange 11 when the latter is placed in position. A single movement of the locking ring 37 locks all of the pins simultaneously and the screw 40 locks the ring in place.

The expander tube 15 preferably has a working face 40a and a thinner back wall 41 defining an inflation chamber 42 having outwardly extending margins 43. The chamber 42 may be substantially closed in the deflated condition. If desired, the expander tube may have recesses, such as the grooves 44 formed in its working face, as such recesses have been found in many cases to eliminate or reduce objectionable noise and vibration in braking.

Figure 3:
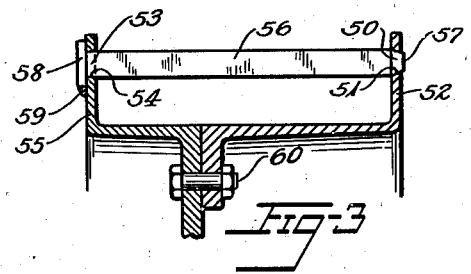
Fig. 3 is a cross-sectional view showing a modified construction.
Figure 4:
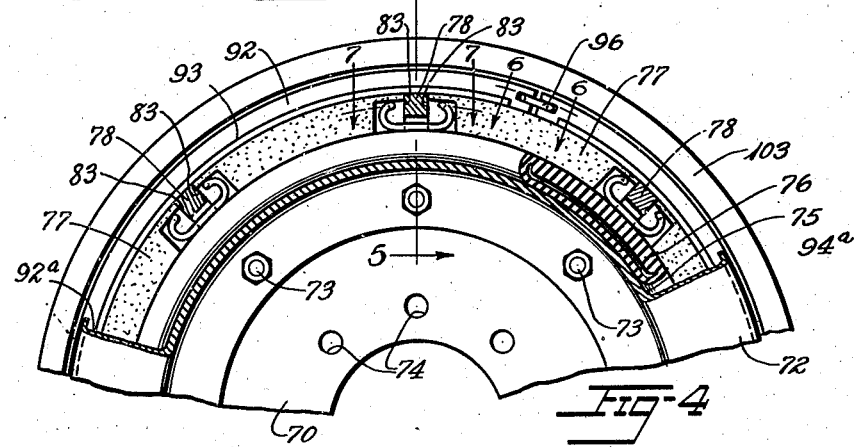
Fig. 4 is a side elevation of a further modified construction, partly broken away and partly in section.

In some assemblies it may be desirable to dispense with the locking ring described in the embodiment above described and to use a thrust pin 56 of the design as shown in the embodiment of Fig. 3 in which one end 50 of the pin 56 is tapered, as at 57 to fit tightly in a tapered hole 51 in the torque flange 52 and an opposite end 53 fits in an opening 54 through torque flange 55. A head 58 of the thrust pin 56 may be tack welded as at 59 to fasten the pin in position in the torque frame of which flanges 52, 55 are held together by bolts 60.

Referring to the embodiment of the invention shown in Figs. 4 to 7, a torque frame 70 comprises opposite flanges 71 and 72 fastened together by bolts 73 and adapted to be mounted on a flange of a shaft (not shown) by means of holes 74. The flanges 71 and 72 form a circumferential channel 75 adapted to seat an annular expander tube 76 at the bottom of the channel. Seated upon the expander tube within the channel is a series of pressure blocks 77 of suitable stiff material. To provide a high coefficient of friction at the outer faces of the pressure blocks, and also to provide for reduction of weight, and to insulate the tube against heat, these are preferably made of molded plastic material such as Bakelite, hard rubber, or the like. The adjacent blocks 77 are separated by thrust pins 78 extending between the blocks through openings 79 in the torque flange 71, and the opposite end 80 of each pin is tapered and fitted into a tapered hole 81 in the torque flange 72.

After assembly of the parts, the thrust pin is tack welded as at 82 or otherwise attached to securely fasten the pin to the torque flange 71. The end faces 83 of adjacent pressure blocks cooperate with the thrust pins 78 to prevent circumferential slippage of the blocks when the blocks move radially under pressure delivered to the blocks 77 by the annular expander tube 76. For retracting the blocks when pressure of the expander tube is released, a shallow hole 85 is formed in the lateral faces of the pressure blocks located near but away from the axial end faces 83 thereof and the side faces of the blocks are recessed as at 87 from the holes 85 to the adjacent end faces of the blocks and below the outer circumference face, to receive a C-shaped clip spring 88. This recess 87 provides a space to accommodate the thickness of the spring so that the same will not have objectionable interference with the inner faces of the torque flanges during radial movement of the pressure blocks.

Figure 7:
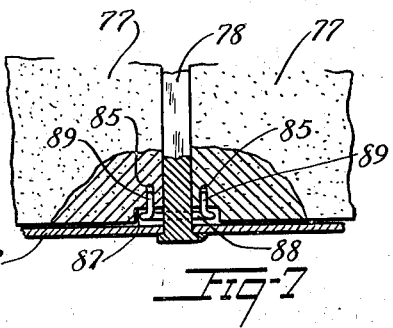
Fig. 7 is a section taken along the line 7—7 of Fig. 4.

The spring 88, illustrated for example in Fig. 7 of the drawings, may be of wire and has inturned ends 89 adapted to enter the holes 85 of adjacent blocks. The spring 88 extends under and may bear on the under surface of the thrust pin 78 or operating clearance may be provided between the spring and pin. The ends 89 of the spring are received in the holes 85 in the adjacent pressure blocks 77 and bear against the sides under tension and thus maintain tension between the blocks when the expander tube 76 forces the pressure blocks radially outward so that the tension thus applied will return the pressure blocks to their original position by urging the pressure blocks radially inward to a smaller diameter when the fluid pressure is released from the expander tube 76. Where desired, the springs may bear against the thrust pins, against which they may fulcrum, thereby increasing their tension and providing a condition of increased tension acting to retract the blocks.

Figure 5:
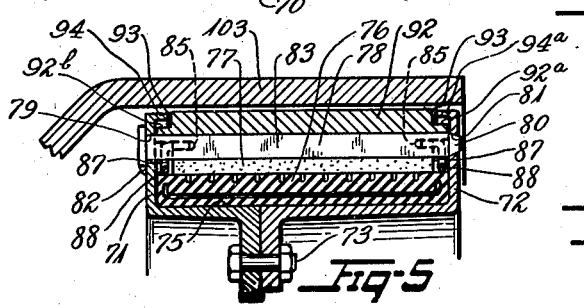
Fig. 5 is a cross-sectional view taken along the line 5—5 of Fig. 4.
Figure 6:
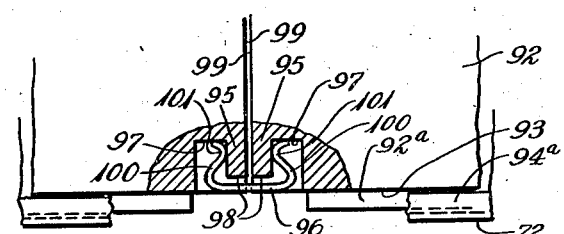
Fig. 6 is a section taken along the line 6—6 of Fig. 4.

A full circle friction band 92 marginally rabbeted at its outer periphery 93, as shown in Fig. 5, is disposed in the channel 75 and in circumferential contact and floating engagement, with the outer peripheral surface of the pressure blocks 77. The radial displacement of the band 92 may be limited by inwardly turned lips 94, 94a of the torque flanges 71 and 72, engaging over rabbeted margins 92a, 92b of the band 92. The band 92 is resiliently fastened together at its ends 95 by a C-shaped clip spring 96 whose construction is illustrated for example in Fig. 6 of the drawings. The lateral edge of the band 92 has shallow holes 97 adapted to receive the ends of the springs 96. The holes 97 are located at the adjoining ends 95 of the band but are located away from the adjacent faces 99 thereof. The side faces that lie between the holes 97 and the adjacent end faces 99 of the adjoining ends of the band 92 are recessed at 98 to receive the spring 96 inward of the lateral edge of the band 92.

The springs 96 may be of spring wire and have ends 100 inwardly bent and terminating in smooth curve 101 at the end of the spring. These inwardly bent curved ends 100 of the spring 96 join the ends of the band by insertion of the ends of the spring into the holes 97 at each end of the band. The smooth curved ends 101 of the spring bear on the walls of the holes 97 and urge the band radially inward to a smaller diameter over the pressure blocks 77.

This construction of the band and adjoining spring provides for circumferential elongation of the band 92 when the pressure blocks 77 move in radial compression against the band 92 and thus move the band 92 into frictional engagement with a cooperating drum 103 to retard or completely stop the motion of the latter. By providing the parts of materials such that the coefficient of friction is greater between the adjacent surfaces of the pressure blocks 77 and the band 92 than the coefficient of friction between the band 92 and the drum 103, for example by providing the blocks 77 of Bakelite or hard rubber acting against the inner face of the band 92 of braking composition, the latter acting against the metal brake drum, slippage of the band 92 upon the blocks can be prevented or minimized so that the torque will be transmitted to the pressure blocks.

Figure 8:
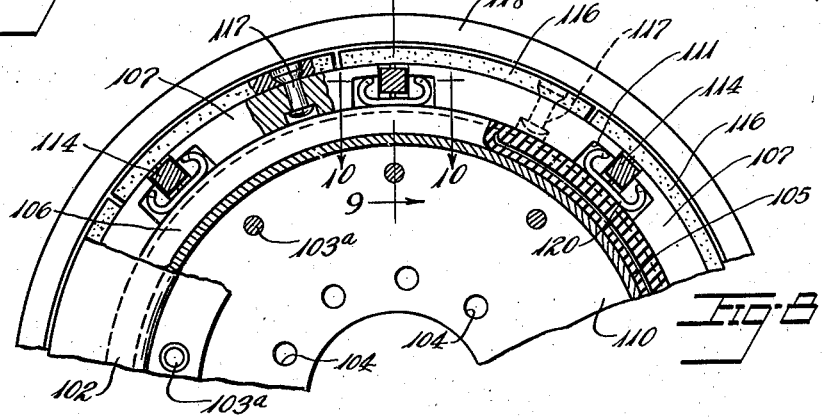
Fig. 8 is a side elevation of a still further modified construction, partly broken away and partly in section.
Figure 10:
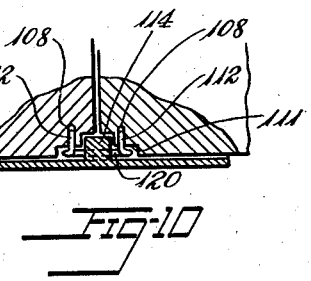
Fig. 10 is a section taken along the line 10—10 of Fig. 8.
Figure 9:
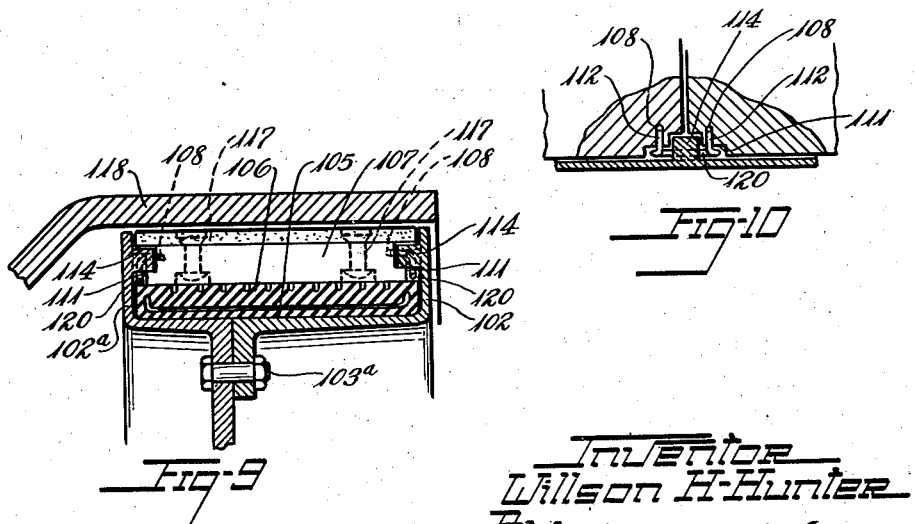
Fig. 9 is a sectional view taken along the line 9—9 of Fig. 8.

Referring to the embodiment of the invention in Figs. 8 to 10 a torque frame 110 comprises flanges 102 and 102a fastened together by bolts 103a. The frame is adapted to be mounted on a flange of a shaft (not shown) by means engaging through holes 104. The flanges 102 and 102a form an outwardly directed circumferential channel 105 adapted to seat an annular expander tube 106 at the inner face of the channel. Seated on the expander tube is a series of pressure blocks 107 preferably of Bakelite or other suitable plastic material providing light weight and heat insulation. A hole 108 is formed in each end of the lateral faces of the pressure blocks located near but away from the axial end faces thereof and the side faces of the pressure blocks are recessed at 111 to receive C-shaped clip springs 120 to retract the blocks. This recess 111 provides a space to accommodate the thickness of the spring between the torque flanges and the blocks.

The spring 120 illustrated for example in Fig. 10 of the drawings has inturned ends 112 adapted to enter the holes 108 to urge the blocks toward each other. The spring 120 is accommodated under a thrust lug 114 formed on the flanges 102, 102a. In the non-braking position the springs may clear the thrust lugs and may contact only the pressure blocks 107 and thus maintain tension to urge the adjacent pressure blocks circumferentially toward each other so that the tension thus applied will return the pressure blocks to their original position by urging the pressure blocks radially inward to a smaller diameter when the fluid pressure is released from the expander tube 106. The thrust lugs 114 prevent objectionable circumferential displacement of the pressure blocks 107 when the frictional system is in operation.

A series of friction blocks 116 preferably of molded heat-resisting material is disposed in ship-lap relation over the pressure blocks 107 and the thrust lugs 114. The friction blocks 116 are securely fastened to the pressure blocks 107 by suitable means such as rivets 117. The pressure blocks 107 and the friction blocks 116 work in cooperation between the expander tube 106 and a rotatable drum 118. The friction blocks overlap spaces between the pressure blocks and thus shield the expander tube from direct radiation of heat from the drum.

Variations may be made without departing from the scope of the invention as it is defined by the following claims.

I claim:

1. In a frictional mechanism a plurality of circumferentially disposed pressure elements having recesses in their walls and C-shaped springs having converging portions engaging in the recesses of adjacent elements in a manner to exert resilient pressure against said elements directly in the circumferential direction for resisting circumferential separating movement of said elements, said springs being disposed entirely within said recesses of adjacent pressure elements.

2. In a frictional mechanism a pressure band structure having adjacent ends and recesses in the walls of the structure near said ends, and a C-shaped spring having converging portions engaging in said recesses and bridging said ends in a manner directly to resist separating movement of said ends, the recesses being of a form to accommodate said spring substantially within the longitudinally extending walls of the band structure, and said springs being disposed entirely within said recesses of said adjacent ends.

3. A frictional mechanism comprising a pair of concentrically arranged relatively rotatable members, one of said members having a channel open toward the other member, an expander seated in said channel, a series of pressure elements upon said expander and movable radially of the channel, spring means having hooked ends with the hooks facing each other and engaging the ends of adjacent elements for resiliently urging them directly in a circumferential direction toward each other, and means for limiting circumferential movement of said elements.

4. A frictional mechanism comprising a pair of concentrically arranged relatively rotatable members, one of said members having flanges defining a channel open toward the other member, an expander seated in said channel, a series of pressure elements upon said expander and movable radially of the channelled member, spring means having converging portions seated in lateral margins of the elements and engaging adjacent elements for resiliently urging them directly in a circumferential direction toward each other, and means for limiting circumferential movement of said elements.

5. A frictional mechanism comprising a pair of concentrically arranged relatively rotatable members, one of said members having flanges defining a channel open toward the other member, an expander seated in said channel, a series of pressure elements upon said expander and movable radially of the channelled member, spring means having converging portions engaging the ends of adjacent elements for resiliently urging them directly in a circumferential direction toward each other, and thrust pins extending between said flanges and between ends of adjacent elements for limiting circumferential movement of said elements.

6. A frictional mechanism comprising a pair of concentrically arranged relatively rotatable members, one of said members having separable flanges defining a channel open toward the other member, an expander seated in said channel, a series of pressure elements upon said expander and movable radially of the channelled member, spring means engaging the ends of adjacent elements for resiliently urging them toward each other, thrust pins extending from said flanges between ends of adjacent elements and through openings in the other flange for limiting circumferential movement of said elements, and locking means engaging the ends of the thrust pins at said other flange.

7. A frictional mechanism comprising a pair of concentrically arranged relatively rotatable members, one of said members having separable flanges defining a channel open toward the other member, an expander tube seated in said channel, a series of pressure elements upon said expander tube and movable radially of the channelled member, spring means engaging the ends of adjacent elements for resiliently urging them toward each other, thrust pins fixed to one of said flanges extending through openings in the other flange and between ends of adjacent elements for limiting circumferential movement of said elements, and locking means egaging the ends of the thrust pins at said other flange, said locking means comprising a rotatable ring seated on said other flange and having keyhole openings for admitting the ends of the thrust pins and said pins having reduced necks for engaging in the reduced portions of said openings.

8. A frictional mechanism comprising a pair of concentrically arranged relatively rotatable members, one of said members having a channel open toward the other member, expander means in said channel, a series of pressure elements upon said expander means and movable radially of the channel, said elements having recesses near their ends, and C-shaped springs spanning the space between successive blocks and having converging portions engaging in said recesses for retracting the elements.

9. A frictional mechanism comprising a pair of concentrically arranged relatively rotatable members, one of said members having a channel open toward the other member, an expander tube seated in said channel, a series of pressure elements upon said expander tube and movable radially of the channel, thrust elements on one of said flanges and extending between successive pressure elements for limiting circumferential movement thereof, said pressure elements having mortices near their axial faces, and C-shaped springs spanning the space between successive pressure elements and engaging in the mortices thereof for retracting the pressure elements, said spring being engageable with the under side of said thrust elements to stiffen the springing action.

10. A frictional mechanism comprising a pair of concentrically arranged relatively rotatable members, one of said members having a channel open toward the other member, an expander seated in said channel, a series of pressure blocks upon said expander and movable radially of the channel, spring means engaging the ends of adjacent pressure blocks for resiliently urging them toward each other, means on said channel and extending between successive blocks for limiting circumferential movement of said blocks, and a structure of friction material overlying said pressure blocks for frictionally engaging the other rotatable member.

11. A frictional mechanism as defined in claim 10 in which said friction structure comprises a friction band upon said pressure blocks.

12. A frictional mechanism as defined in claim 10 in which said friction structure comprises a series of friction elements mounted on said pressure blocks in ship-lap arrangement.

13. A frictional mechanism comprising a pair of concentrically arranged relatively rotatable members, one of said members having a channel open toward the other member, an expander tube seated in said channel, a series of pressure blocks upon said expander tube and movable radially of the channel, spring means engaging the ends of adjacent pressure blocks for resiliently urging them toward each other, means on said channel and extending between successive blocks for limiting circumferential movement of said blocks, a band of friction material overlying said pressure blocks for frictionally engaging the other rotatable member, the band presenting adjacent ends, and spring means engaging the adjacent ends of said band and resisting circumferential separating movement of said ends.

14. A frictional mechanism comprising a torque frame having a series of openings, an annular expander tube disposed in said frame, pressure elements having openings, C-shaped springs having hooked portions facing each other and received in the openings of said elements, and a series of torque pins disposed between said elements and received in said openings of said torque frame.

15. A frictional mechanism comprising a pair of concentric friction structures, one of said pair being rotatably mounted in respect to the other of said pair, means to move the radially inner one of said pair into frictional engagement with the other, means to limit circumferential displacement of the inner of said structures during frictional engagement of the pair, the radially inner structure comprising a pair of adjacent end portions having slots at the inner peripheral face thereof and angularly extending toward the ends, but terminating short of the end faces, and a retractor spring in said slots to resist circumferential separating movement of said ends.

16. A frictional mechanism comprising a torque frame, said torque frame having flanges providing a channel between said flanges, a friction drum rotatably mounted with respect to said torque frame, a series of friction elements adapted to engage and disengage with said friction drum, an expander tube in said channel to effect such engagement and disengagement, said friction elements in said channel having slots in their inner peripheral surfaces and extending angularly toward the end faces thereof, retractor springs in said slots each generally in its intermediate flat portion and having turned margins received in said slots, a series of thrust pins disposed between adjacent ends of said friction elements, said thrust pins extending through said flanges to prevent circumferential displacement of said elements in said channel, and a ring having a series of bayonet locking slots receiving ends of said thrust pins that extend through said flanges to lock said thrust pins in position.

17. A frictional mechanism comprising a torque frame, annular flanges extending from said torque frame, a frictional drum rotatably mounted in relation to said torque frame, an expander tube disposed between said torque flanges, a series of pressure blocks disposed on said tube and having recesses in their sides, thrust resisting means disposed between adjacent pairs of blocks, a series of retractor springs having bent margins disposed in said recesses of adjacent pressure blocks and adapted to exert pressure on the blocks to resist circumferential separating movement thereof, a friction band disposed on said pressure blocks, said band having a pair of end portions and openings in the sides of said portions, and springs having bent margins in said openings for resisting separating movement of said end portions.

18. A frictional mechanism comprising a torque frame, annular flanges extending from said torque frame, a frictioal drum rotatably mounted in relation to said torque frame, an expander tube disposed between said torque flanges, a series of pressure blocks having recesses in their sides near end portions of the blocks, said recesses extending to the adjoining ends of the blocks, torque means between blocks, retractor springs each having bent end portions in said recesses and substantially within the lateral confines of the blocks, and friction elements disposed on said pressure blocks and fastened in circumferentially overlapping relation to said blocks to break joints with said blocks.

WILLSON H. HUNTER.